(12) United States Patent
Ayanam et al.

(10) Patent No.: US 8,943,302 B2
(45) Date of Patent: Jan. 27, 2015

(54) METHOD OF FLASHING BIOS USING SERVICE PROCESSOR AND COMPUTER SYSTEM USING THE SAME

(75) Inventors: Varadachari Sudan Ayanam, Suwanee, GA (US); Baskar Parthiban, Johns Creek, GA (US)

(73) Assignee: American Megatrends, Inc., Norcross, GA (US)

( * ) Notice: Subject to any disclaimer, the term of this patent is extended or adjusted under 35 U.S.C. 154(b) by 367 days.

(21) Appl. No.: 13/568,728

(22) Filed: Aug. 7, 2012

(65) Prior Publication Data

US 2014/0047224 A1  Feb. 13, 2014

(51) Int. Cl.
*G06F 15/177* (2006.01)
(52) U.S. Cl.
USPC .................................. 713/1; 713/2; 713/100
(58) Field of Classification Search
CPC ......... G06F 8/65; G06F 8/665; G06F 21/572; G06F 21/575; G06F 11/301
See application file for complete search history.

(56) References Cited

U.S. PATENT DOCUMENTS

| 8,260,841 | B1 * | 9/2012 | Maity ........................... 709/202 |
| 2010/0228960 | A1 * | 9/2010 | Huang et al. .................. 713/100 |
| 2012/0110562 | A1 * | 5/2012 | Heinrich et al. .............. 717/169 |
| 2013/0304979 | A1 * | 11/2013 | Zimmer et al. ............... 711/103 |

* cited by examiner

*Primary Examiner* — Dennis M Butler
(74) *Attorney, Agent, or Firm* — Morris Manning & Martin, LLP; Tim Tingkang, Esq.

(57) ABSTRACT

A method of flashing a BIOS memory of a computer system is described herein. The method includes executing a kernel of baseboard management controller (BMC) to create a partition for the BMC memory and a second partition for the BIOS memory; detecting whether the host processor is accessing the BIOS memory; controlling a multiplexer (MUX) to allow the first processor to access the BIOS memory when the host processor is not accessing the BIOS memory; and retrieving first BIOS software from the BMC memory and writing the first BIOS software to the BIOS memory.

36 Claims, 5 Drawing Sheets

METHOD OF FLASHING BIOS USING SERVICE PROCESSOR AND COMPUTER SYSTEM USING THE SAME

FIELD

The present disclosure relates to the field of computer systems, and particularly to computer systems that upgrade BIOS using service processors (SPs) or baseboard management controllers (BMCs).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Basic Input/Output System (BIOS) is one of the most crucial components on a computer motherboard. The BIOS software is preloaded into a memory (the BIOS memory) of the BIOS, and typically is the first code run by a computer when powered on. When the computer starts up, the first job for the BIOS is the power-on self-test, which initializes and identifies the system devices such as the CPU, RAM, video display card, keyboard and mouse, hard disk drive, optical disc drive and other hardware. The BIOS then locates a boot loader software held on a peripheral device (designated as a "boot device"), such as a hard disk or a CD/DVD, and loads and executes that software, giving it control of the operating system (OS). This process is known as booting, or booting up, which is short for bootstrapping.

Generally, the BIOS memory for storing the BIOS software is a non-volatile chip, such as an EEPROM chip on the motherboard. Typically, a serial peripheral interface (SPI) bus is used for communicating with the EEPROM chip. In modern computer systems, contents stored in the BIOS chip can be rewritten without removing it from the motherboard, allowing the BIOS software to be upgraded in place. The rewriting process of the BIOS software is generally referred to as flashing the BIOS.

Generally, a "service processor" (SP) or a "baseboard management controller" (BMC) refer to a specialized microcontroller that manages the interface between system management software and platform hardware. The BMC can be embedded on the motherboard of a computer, generally a server. For example, different types of sensors can be built into the computer system, and the BMC reads these sensors to obtain parameters such as temperature, cooling fan speeds, power status, operating system (OS) status, etc. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again.

Till today, effectively and efficiently upgrading BIOS software remains a challenging task. Therefore, a heretofore unaddressed need still exists in the art to address the aforementioned deficiencies and inadequacies.

SUMMARY

Certain embodiments are directed to a method of flashing a BIOS memory of a computer system including a baseboard management controller (BMC) and a host processor, the BMC including a first processor and a BMC memory. The method includes: executing, at the first processor, a kernel to create at least one first partition for the BMC memory and a second partition for the BIOS memory; detecting, at the first processor, whether the host processor is accessing the BIOS memory; controlling a multiplexer (MUX) to allow the first processor to access the BIOS memory when the host processor is not accessing the BIOS memory; and retrieving first BIOS software, at the processor, from the BMC memory and writing the first BIOS software to the BIOS memory.

In certain embodiments, the method further includes: probing, at the first processor, the BMC memory to obtain information of the BMC memory; and probing, at the first processor, the BIOS memory to obtain information of the BIOS memory.

In certain embodiments, the method further includes: retrieving, at the first processor, from a data module first partition configuration information using identity information of the BMC memory obtained by probing; retrieving, at the first processor, default identity information preset for the BIOS memory when the probing for the BIOS memory fails; retrieving, at the first processor, from the data module second partition configuration information using the default identity information; creating, at the first processor, the at least one first partition in accordance with the first partition configuration information; and creating, at the first processor, the second partition in accordance with the second partition configuration information.

In certain embodiments, the method further includes: utilizing a communication interface between the first processor and the BMC memory to detect presence and identity of the BMC memory; and utilizing a communication interface between the first processor and the BIOS memory to detect presence and identity of the BIOS memory.

In certain embodiments, the method further includes comparing data in a first sector of the BIOS memory with data in a second sector of a BIOS image. The second sector corresponds to the first sector, and the BIOS image contains the first BIOS software. The method further includes in response to a determination that the data in the first sector differ from the data in the second sector, erasing the data in the first sector and writing the data in the second sector to the first sector.

Certain aspects of the present disclosure are directed to a computer system. The computer system includes a baseboard including a host processor and a BIOS memory. The host processor is configured to execute an operating system. The computer system also includes a baseboard management controller (BMC) in communication with the baseboard through an interface, the BMC including a first processor and a BMC memory. The BMC memory is configured to store first BIOS software, and the first processor is configured to execute a kernel, the kernel having at least one first partition for the BMC memory and a second partition for the BIOS memory; and a multiplexer (MUX) configured to operatably control access to the BIOS memory by the first processor or by the host processor. The first processor is configured to detect whether the host processor is accessing the BIOS memory, control the MUX to allow the first processor to access the BIOS memory when the host processor is not accessing the BIOS memory, and retrieve the first BIOS software from the BMC memory and write the first BIOS software to the BIOS memory.

Certain aspects of the present disclosure are directed to a baseboard management controller (BMC). The BMC includes a BMC memory configured to store first BIOS software; and a first processor configured to execute a kernel, the kernel having a first memory partition for the BMC memory and a second memory partition, utilize the first memory partition to retrieve the first BIOS software from the BMC memory, and utilize the second memory partition to output the first BIOS software.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "memory" generally refers to the physical devices used to store programs (sequences of instructions) or data (e.g. program state information) on a temporary or permanent basis for use in a computer or other digital electronic device. The terms "non-volatile memory" or "nonvolatile memory" refer to computer memory that can retain the stored information even when not powered, and the term "volatile memory" refers to computer memory that requires power to maintain the stored information.

As used herein, the term "communication" generally refers to communication through physical or non-physical connections between computer components or devices with or without intermediate communicating devices, links, interface or other intercommunicating media. Communication can be generally performed by, but not limited to, non-physical signals such as electronic, magnetic, optical or other types of signals.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

As used herein, the term "probe" generally refers to an action of identifying a memory part or validating the parameters of the configured memory part. The probing process for memory parts is generally performed in the start-up or booting process for confirming the availability and workability of the memory parts.

The term "code", as used herein, may refer to executable instructions, programs, routines, functions, classes, and/or objects, and may be in the form of software, firmware, and/or microcode. The term "shared", as used herein, means that some or all codes or images from multiple modules may be executed using a single (shared) processor. In addition, some or all codes or images from multiple modules may be stored by a single (shared) memory. The term "group", as used herein, means that some or all codes or images from a single module may be executed using a group of processors. In addition, some or all codes or images from a single module may be stored using a group of memories.

The terms "chip" or "computer chip", as used herein, generally refer to a hardware electronic component, and may refer to or include a small electronic circuit unit, also known as an integrated circuit (IC), or a combination of electronic circuits or ICs.

As used herein, the term "module" may refer to an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "checksum", as used herein, refers to a data checking process, which includes a fixed-size datum computed from an arbitrary block of digital data for the purpose of detecting accidental errors that may have been introduced during its transmission or storage. The integrity of the data may be checked at any later time by recomputing the checksum and comparing it with the stored one. If the checksums match, the data was almost certainly not altered.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The service processor or the BMC as a provider of out-of-band management capabilities calls for a logical extension to its features to support BIOS flash upgrade from remote. In modern server motherboard designs, the BIOS memory is made available to the service processor. The service processor has its own non-volatile memory, such as an EEPROM flash memory chip, that contains the service processor firmware. The service processor and the motherboard can use a multiplexer (MUX) to share access to the BIOS memory.

In certain embodiments, initially, when the service processor boots, typically it can access only its own dedicated memory, such as an flash chip. The service processor, being a management controller, boots up first before the BIOS in the motherboard of the computer system. Then the BIOS boots up. Simultaneous access of the BIOS memory is not allowed, and the service processor relinquishes the BIOS memory access. The BIOS memory is made available to the SP using a multiplexer (MUX). Switching the MUX enables the hardware of the computer system such as the CPU to share with the SP access to the BIOS memory.

When the kernel of the SP firmware, such as a Linux kernel, boots up, the kernel detects and identifies the memory parts or chips, such as the SPI flash memory parts, that the SP has access and control. The SP can also validates the parameters of the memory parts. This identifying and validating process is generally referred to as probing the memory parts, and operation of the probing process differs depending on the type of the memory parts. In certain embodiments, the kernel can have access to a memory configuration file or a memory data module that include information of various memory chips that are available on the market. For example, the configuration file or the data module can include a list of hundreds of memory chips and the respective information of each memory chip, such as information such as the vendor ID, device ID, the sector size, and total size. The information may be used for identification and validation of the probing process. In certain embodiments, the kernel may perform the probing process by sending a command of a underlying bus or interface to each memory part, and receive a response from the memory parts that are in communication with the SP. The response can include information of the memory part, such as the vendor ID and device ID of the memory part. Thus, the kernel can recognize the presence of the memory part, and can set up partition with the information retrieved from the configuration file or data store of the memory part from the table in the kernel.

In certain embodiments, the configuration of the kernel can be set up to indicate the number of memory chips to which the kernel is expected to have access. For example, where flash chips are used as the memory for the SP, the number of flash banks in the configuration of the kernel is configured to indicate the number of flash chips. Thus, the kernel probes the flash memory parts based on the number of flash banks in the configuration. For example, typically the SP has access to a sole flash memory part, and the number of flash banks is set to 1 to indicate accommodate for the sole flash memory of the SP alone. Thus, in the probing process, the kernel will probe only once to detect one chip, e.g. The flash memory of the SP based on the number of flash banks. The memory chip of the SP will respond to with information of the itself, such as the vendor ID and the device ID or the part number. After receiving the memory chip information, the service processor matches that received information with the memory configuration file or memory data module. If a match of the flash memory, for example by matching the vendor ID and the device ID, is found, the Linux kernel will retrieve necessary information such as sector size and the total size to create a memory technology device (MTD) partition for the memory chip. After, user space applications can access the membership through the kernel and the MTD partition.

In order to instruct the kernel to the probe to memory chips (i.e., the SP memory chip and the BIOS memory chip), the configuration of the kernel can be configured accordingly. For example, the flash banks can be set to 2 to indicate to flash chips. However, in the typical booting process of the SP, the BIOS memory is not accessible by the SP. Thus, even if the number of flash banks in the kernel configuration has been set to 2 to indicate the existence of both the flash memory of the SP and the BIOS memory, probing for the BIOS memory part by the SP will fail. Thus, the MTD partition for the BIOS memory will not be created, and the user space applications cannot access this device for flash upgrade.

In certain embodiments, the kernel creates a MTD partition for the BIOS memory in the booting process despite that the BIOS memory is not accessible for the SP (i.e., The probe for the BIOS memory fails). Thus, a MTD partition for the BIOS memory is still created in the kernel, which allows the SP firmware to access the BIOS memory and perform flash BIOS upgrade.

Figure 1:
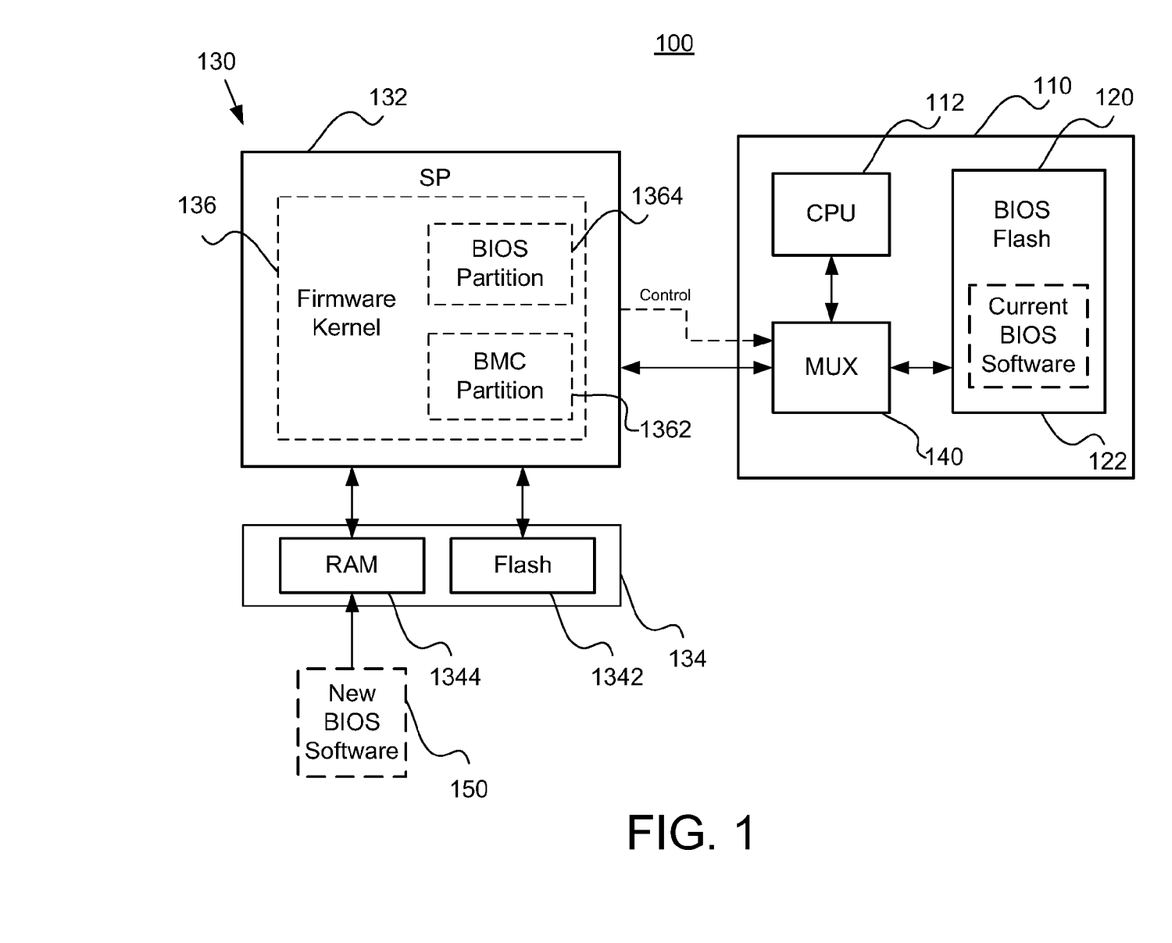
FIG. 1 schematically depicts a computer system according to certain embodiments of the present disclosure.

FIG. 1 schematically illustrates a computer system 100 and according to certain embodiments of the disclosure. The computer system 100 can be a general purpose computer system and can be desktop computers, laptop computers, tablet computers, hand-held computers, server computers, blade servers, industrial computers, appliances controllers, electronics equipment controllers, etc. The computer system 100 can be a special purpose computer system or a system that incorporates more than one interconnected system, such as a client-server network.

The computer system 100 of FIG. 1 only represents an exemplary embodiment of the present disclosure, and therefore should not be considered to limit the disclosure in any manner. In certain embodiments, the computer system 100 may include other physical or virtual components not shown in FIG. 1.

In the computer system 100, a baseboard or motherboard 110 is provided to form the central intelligence. The baseboard 110 is a printed circuit board to which a plurality of components or devices may be connected. Although not explicitly shown in FIG. 1, the components on the baseboard 110 are interconnected, and the layout of the components on the baseboard 110 and the manner of the interconnection between the components on the baseboard 110 is herein referred to as the configuration of the baseboard 110. One of ordinary skill in the art would appreciate that the configuration of the baseboard 110 may be adjusted or changed according to the necessary design or manufacturing requirements.

In one embodiment, the components on the baseboard 110 include, but not limited to, a central processing unit (CPU) 112, a BIOS memory 120, and other required memory and Input/Output modules (not shown). Further, a BMC 130 is provided in the computer system 100, and the BMC 130 is connected to the baseboard 110 through an interface. In certain embodiments, the interface may be physical hardware interface such as electrical connectors, buses, ports, cables, terminals, or other I/O devices. Further, a multiplexer (MUX) 140 is provided to control the access to the BIOS memory 120, either from the BMC 130 or from the CPU 112. In certain embodiments, the MUX 140 can be located on the baseboard 110.

The CPU 112 is a host processor which is configured to control operation of the computer system 100. The host processor can execute an operating system of the computer system 100. In some embodiments, one of ordinary skill in the art would appreciate that the baseboard 110 may run on or more than one CPU as the host processor, such as two CPUs, four CPUs, eight CPUs, or any suitable number of CPUs.

The BIOS memory 120 is in communication to the CPU 112, and is configured to store BIOS software for performing the booting functions as described above, such as the initiation and power-on self-test, identifying the system devices, locating the boot loader software on the boot device, loading and executing the boot loader software and giving it control of the operating system (OS). Generally, the BIOS memory 120 is a non-volatile memory. For the purpose of distinguishing the pre-upgrading and post-upgrading BIOS software, the BIOS software currently stored in the BIOS memory 120 is referred to as a current BIOS software 122.

The BMC 130 in this embodiment serves as the service processor, which is in communication to the baseboard 110 through the interface or bus, such as LPC bus System Management Bus. In certain embodiments, other service processors may be used to replace the BMC 130. The BMC 130 includes a processor 132 and a BMC memory 134. In this embodiment, the BMC memory 134 includes a flash memory 1342, which is a writable non-volatile memory, and a RAM 1344, which is a writable volatile memory. One of ordinary skill in the art would appreciate that other types of writable non-volatile memory and writable volatile memory may replace the flash memory 1342 and the RAM 1344 as shown in FIG. 1, or may be added to the BMC memory 134 as additional memory parts. In this embodiment, the flash memory 1342 and the RAM 1344 are respectively in communication with the processor through appropriate buses or interfaces, such as SPI buses. The processor 132 of the BMC 130 is configured to execute a kernel for performing the functions of the BMC 130. In this embodiment, the kernel is a Linux kernel 136 as shown in FIG. 1. Other types of kernel may also be used as the kernel of the processor 132.

The MUX 140 is configured to operatably control access to the BIOS memory 120, either from the BMC 130 or from the CPU 112. Typically, only one of the BMC 130 and the CPU 112 may have access to the BIOS memory at a time. The BIOS memory 120 is not accessible to the BMC 130 when the BIOS is operating (i.e., the BIOS memory 120 being accessed by the CPU 112). The processor 132 of the BMC 130 can control the MUX 140 to allow access to the BIOS memory 120 by the BMC 130 when the CPU 112 does not use the BIOS memory 120. In certain embodiments, the BMC 130 can monitor whether the CPU 112 is using the BIOS memory 120. When the BMC 130 detects or learns that the CPU 112 does not use the BIOS memory 120, the processor can instruct the MUX 140 to grant the BMC 130 access to the BIOS memory 120. As described above, the processor 132 of the BMC may perform monitoring by reading the sensors on the baseboard 110 to obtain parameters such as the operating system (OS) status of the CPU 112, or the BIOS operating status of the BIOS memory 120.

In certain embodiments, the CPU 112 does not use the BIOS memory 120 in a variety of occasions. For example, when the computer system 100 is in a standby mode, the CPU 112 (the host processor) is powered down and cannot have access to the BIOS memory 120. Thus, the BMC 130, which is still running even if the computer system 100 is in the standby mode, may have access to the BIOS memory 120. In another example, when the computer system 100 is in an operating mode, the CPU 112 (the host processor) is running under the operating system and would not have access to the BIOS memory 120. Thus, the BMC 130 may have access to the BIOS memory 120.

As discussed above, when the kernel (such as a Linux kernel) of the SP boots up, it typically can access only its own dedicated flash memory. For example, the BMC 130 probes (identify and validate) memory parts based on the number of flash banks configured in its kernel configuration. The probing process described here is for the flash memory parts, such as the flash memory 1342, but if other types of writable non-volatile memory is used to replace the flash memory 1342, a probing process may be used for the writable non-volatile memory.

If the BMC 130 has only one flash memory 1342 and no other flash memory parts, the number of flash banks will be set to 1 to accommodate for the flash memory 1342 of the BMC 130 alone. In this case, the Linux kernel will probe information of the flash memory 1342, such as the flash part vendor IDs or part numbers. For example, the kernel 136 can control or utilize the underlying buss or interface (e.g. SPI) to detect the presence and identity of the flash memory 1342. The obtained information of the flash memory 1342 can include its vendor ID and part number. Then the kernel matches the vendor ID and the part number with the information contained in the memory configuration file or memory data module. If a match is found, the Linux kernel retrieves additional memory configuration information such as the sector size and the total size, and create a MTD partition 1362 (the first partition) for the flash memory 1342 of the BMC 130 using the additional information. Thus, the flash memory 1342 is accessible by the user space applications of the SP firmware. Because the kernel will access the BIOS memory 120 in addition to the flash memory, the number of flash banks is set to 2 in the configuration. However, as described above, the probe for BIOS memory will fail because the BIOS memory 120 is not accessible to the BMC 130 when the Linux kernel of the BMC 130 boots up. In certain embodiment, when the Linux kernel 136 fails to probe the BIOS memory 120, the kernel 136 uses a set of preset or default parameters as the response received after probing. For example, the set of parameters can include the same vendor ID and device ID as the those of the BIOS memory 120. The kernel 136 retrieves that default identity information from the configuration, and then matches the default identity information with the information stored in the memory configuration or memory data module. In other words, the kernel proceeds as if it has probed a "virtual BIOS memory" which is exactly the same configuration as the BIOS memory 120. If a match is found by using a process similar to the process described above for matching the SP flash memory info, the kernel then retrieves additional information such as sector size and total size for the virtual BIOS memory from the memory configuration or memory data module. The kernel then creates a virtual BIOS MTD partition using the retrieved additional information, as if the kernel successfully probes a non-existing dummy virtual memory having the same configuration as the BIOS memory 120. The virtual BIOS MTD partition is configured as if the non-existing dummy virtual memory has the same configuration as the actual BIOS memory 120, with all necessary virtual flash part information details (vendor ID, part number, sector size, total size) matching the actual flash parts of the BIOS memory 120. Thus, even if the probe fails for the actual BIOS memory 120, the processor 132 of the BMC 130 would create the virtual BIOS MTD partition 1364 (the second partition), which corresponds to the actual BIOS memory 120. Thus, the Linux kernel 136 has at least one first partition 1362 for the flash memory 1342 and a second partition 1364 corresponding to the BIOS memory 120, and this second partition 1364 can be used by user space applications to perform flash upgrade.

There are several methods for communicating the MTD partition data of the first and second partitions to the Linux kernel. For example, one of the more common methods of defining and detecting MTD partitions stems from one of the original implementations is the Redboot partition table parsing method. Redboot is a bootloader found on many embedded boards. Generally, the system defines a method for storing partition information on the flash memory itself, which is similar in concept to a partition table on a hard disk. When the Redboot partition method is used, an erase block is reserved and specified on the flash memory that holds the partition definitions. Thus, a mapping driver is selected that calls the partition parsing functions during booting to detect the partitions on the flash memory, such as the flash memory 1342 of the BMC memory.

Other methods of defining and detecting MTD partitions include the kernel command line partitioning method and using a dedicated board-specific mapping driver. The kernel command line partitioning method requires the user of the kernel to manually pass the partition information directly on the kernel command line. For different bootloaders of the kernels, some do not have a facility to pass a kernel command line to the kernel upon booting. In these cases, the kernel command line must be configured at compile time and, therefore, is more difficult to change, requiring a recompile of the kernel itself each time the partitions are modified.

In certain embodiments, the BMC 130 may provide the typical functions of managing the interface between system management software and platform hardware performed by BMC or SP, or any other advanced monitoring features and detailed hardware information. In other words, the modification of the Linux kernel 136 does not change the regular functions of the BMC 130, and may be applied to the BMC for any general or specialized purposes.

It is also contemplated that, in addition to the flash memory 1342, the BMC 130 or the service processor may include additional flash memory components or non-volatile memory components that are not explicitly shown in FIG. 1 for other purposes performed by the BMC 130. In this case, the modified Linux kernel 136 may be configured that the number of flash banks is set to be more than 2 to accommodate for the flash memory 1342 of the BMC 130, the BIOS memory 120, and these additional flash memory components or non-volatile memory components of the BMC 130. In other words, if the number of flash banks is set to be N, the number of additional flash memory components or non-volatile memory components of the BMC 130 would be N-2, such that the modified Linux kernel 136 may be configured to create the N partitions to accommodate for the flash memory 1342 of the BMC 130, the BIOS memory 120, and these N-2 additional flash memory components or non-volatile memory components of the BMC 130. Specifically, these N partitions include N-1 first partitions for the flash memory 1342 and the N-2 additional flash memory components or non-volatile memory components of the BMC 130, and one second partition corresponding to the BIOS memory 120.

When the computer system 100 is ready for flashing the BIOS, a new BIOS software 150 may be uploaded to the BMC 130. The new BIOS software 150 such as a BIOS image may be stored in the RAM 1344, which is the writable volatile memory of the BMC 130. As discussed above, when the CPU 112 does not use the BIOS memory 120 (e.g., the CPU 112 is in a standby mode or in an operating mode), the processor 132 of the BMC 130 controls the MUX 140 such that the BIOS memory 120 is accessible to the BMC 130. Thus, the processor 132 of the BMC 130 may retrieve the new BIOS software 150 stored in the RAM 1344, and a comparison between the new BIOS software 150 and the current BIOS software 122 can be then performed. If the current BIOS software 122 mismatches the new BIOS software 150, the new BIOS software 150 is written to the BIOS memory 120 through the interface to replace the current BIOS software 122. In certain embodiments, the comparison is performed by each sector of the BIOS software. Specifically, if a sector of the current BIOS software 122 mismatches a corresponding sector of the new BIOS software 150, the mismatched sector of the current BIOS software 122 in the BIOS memory 120 is erased, and the corresponding sector of the new BIOS software 150 is written to the BIOS memory 120 to replace the mismatched sector of the current BIOS software 122.

Figure 2:
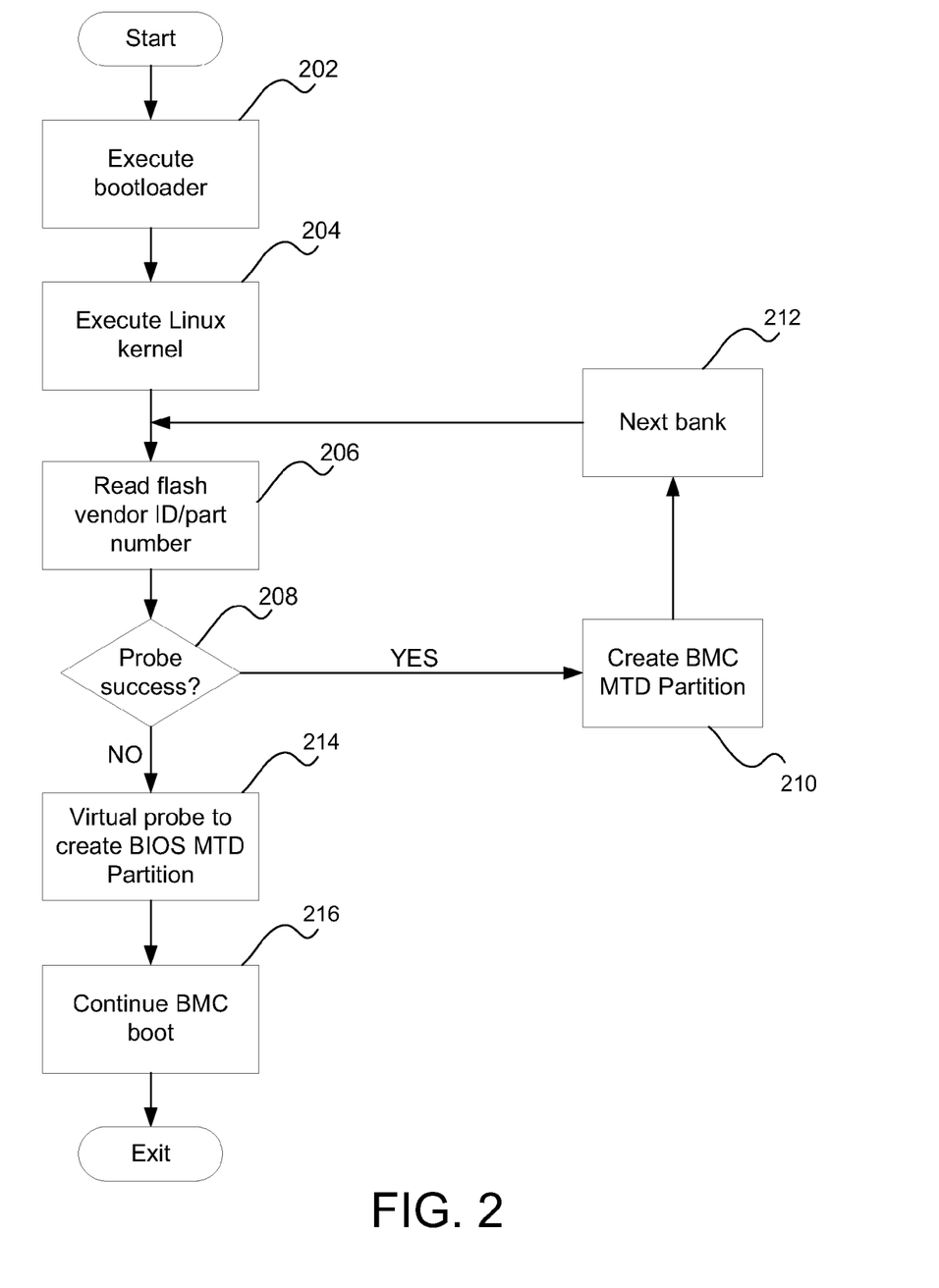
FIG. 2 is a flowchart illustrating a probing process for flashing the BIOS memory according to certain embodiments of the present disclosure.
Figure 3:
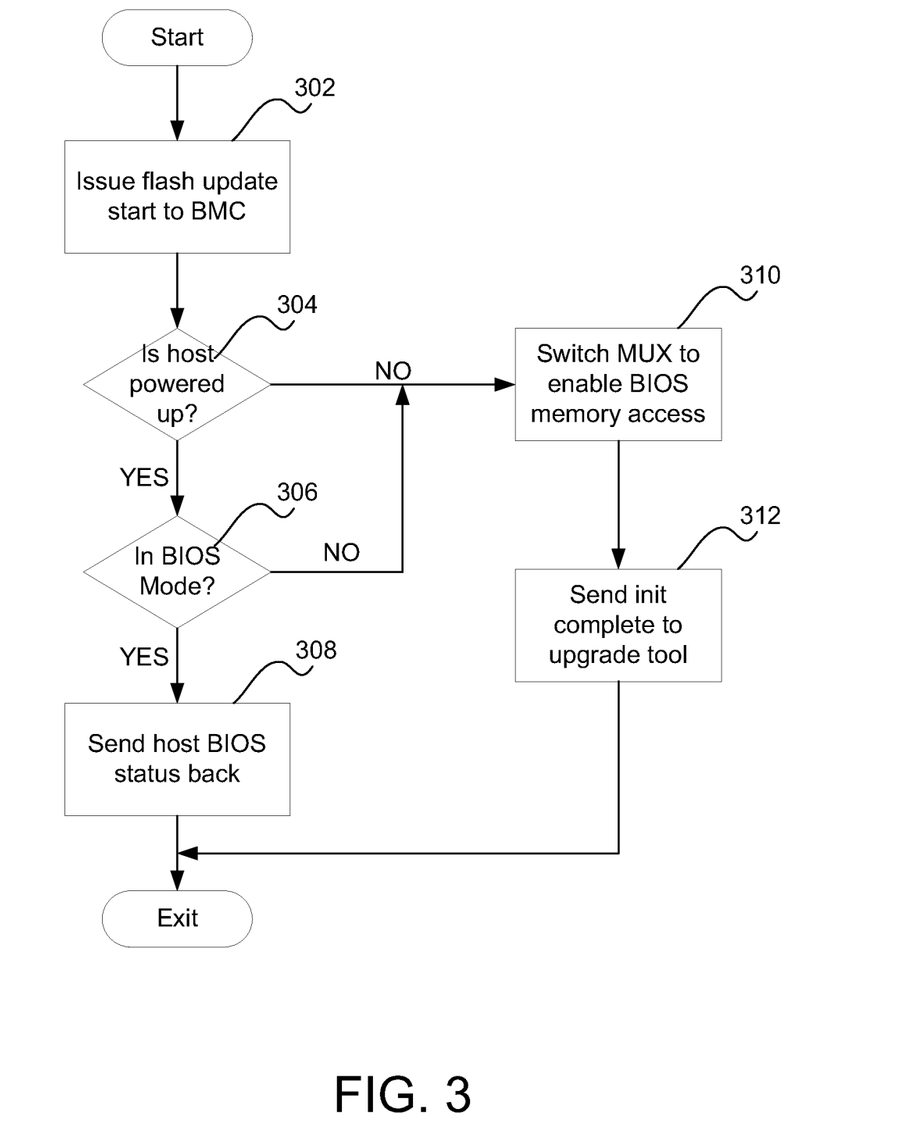
FIG. 3 is a flowchart illustrating an initiation process for flashing the BIOS memory according to certain embodiments of the present disclosure.
Figure 4:
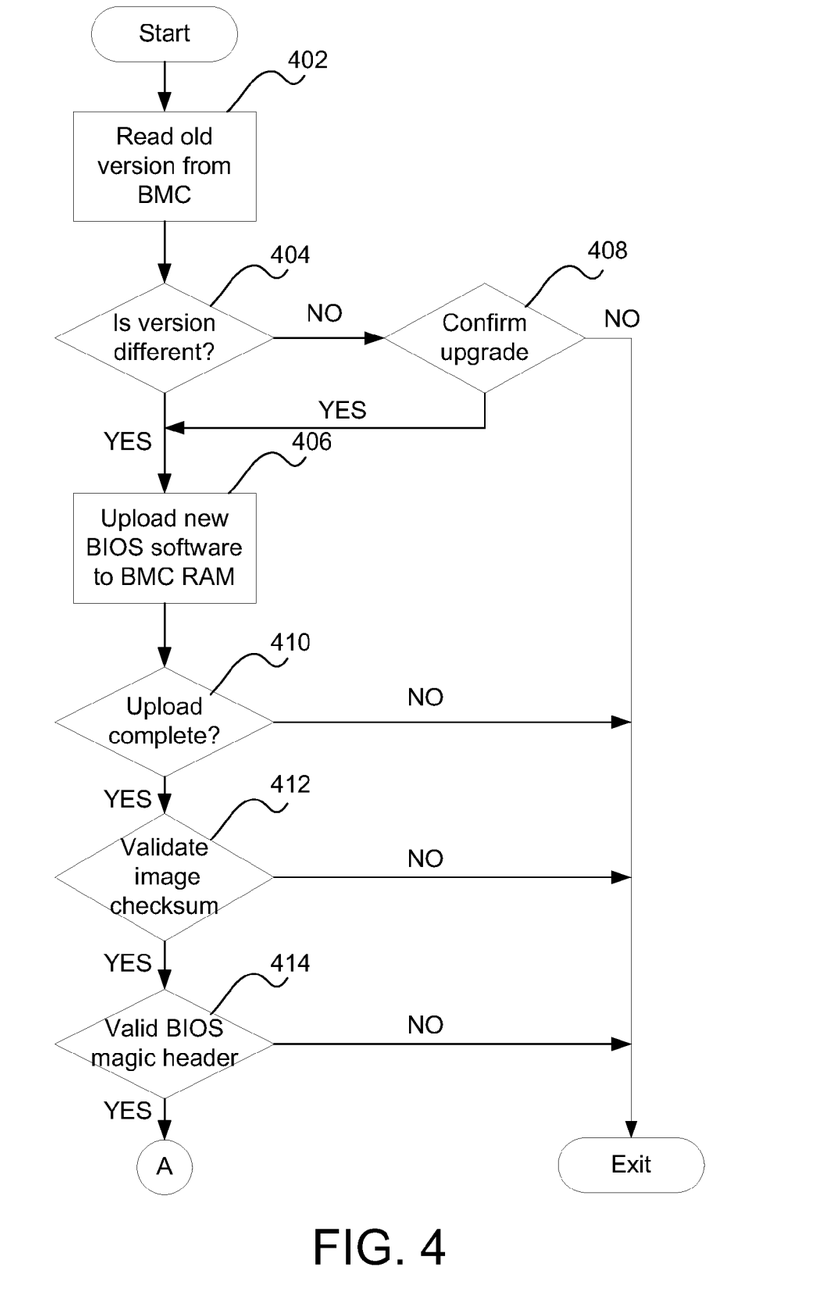
FIG. 4 is a flowchart illustrating an upgrading process for flashing the BIOS memory according to certain embodiments of the present disclosure.

FIGS. 2-4 are flow charts illustrating a process of flashing the BIOS memory in accordance with certain embodiments of the present disclosure. One of ordinary skill in the art would appreciate that the order of procedures of the full process of flashing the BIOS memory as shown in FIGS. 2-4 are merely provided for the convenience of explanation, and some or all of the procedures may be performed in different sequential orders.

Specifically, FIG. 2 shows the probing process for the memory parts according to one embodiment of the disclosure. When the computer system 100 is booting, control of the BMC enters procedure 202. In this embodiment, at procedure 202, control executes the boot loader software. Since the BMC 130 boots up before the BIOS on the baseboard 110, control then enters procedure 204 to execute the kernel of the BMC 130, such as the Linux kernel 136. As described above, the Linux kernel 136 is configured to perform multiple flash bank probing. In other words, the number of flash banks configured in the Linux kernel 136 configuration would be 2 or more.

By executing the Linux kernel, control enters procedure 206 for probing. At procedure 206, control probes the reads the flash chip and receive information of the flash chip, such as the vendor ID or part number of the flash chip, and then enters procedure 208. In this embodiment, the number of flash banks is set to be 2. Thus, at procedure 206, control first probes the flash part information details of the flash memory 1342 of the SP 130. If probing of the flash memory 1342 is successful at procedure 208, control enters procedure 210. At procedure 210, control creates a BMC MTD partition 1362 (the first partition) for the flash memory 1342, and then enters procedure 212 to go to the next flash bank. Back to procedure 206, control then try to probe the flash part information details of the BIOS memory 120, which would lead to a failure of probing because the actual BIOS memory 120 is not accessible at the moment. Since probing of the BIOS memory 132 is unsuccessful at procedure 208, control enters procedure 214. At procedure 214, the control retrieves the default information of the BIOS memory. The virtual BIOS MTD partition 1364 (the second partition) is created by using the default information. Since virtual BIOS MTD partition 1364 is configured to have predefined values with all necessary virtual flash memory part information details (ID, sector size, total size) matching the actual flash parts of the BIOS memory 120, the virtual BIOS MTD partition 1364 corresponds to the actual BIOS memory 120. Then, the probing process is completed, and control enters procedure 216 to continue the BMC booting.

It is also contemplated that, in some embodiments, when the BMC 130 or the service processor may include additional flash memory components or non-volatile memory components for other purposes performed by the BMC 130 the Linux kernel 136 may be configured that the number of flash banks is set to be more than 2 to accommodate for the flash memory 1342 of the BMC 130, the BIOS memory 120, and these additional flash memory components or non-volatile memory components. In this case, at procedures 206-208, control would finish probing all the flash memory components of the BMC 130, including the flash memory 1342 and other additional flash memory components or non-volatile memory components, and creating all BMC MTD partitions for these flash memory components of the BMC 130 at procedure 210, before going through procedure 214 to perform the virtual probe for creating the virtual BIOS MTD partition 1364. In other words, if the number of flash banks is set to be N, control would enter procedure 210 for N-1 times to create the N-1 first partitions, including the BMC MTD partition for the flash memory 1342 and the N-2 additional flash memory components or non-volatile memory components of the BMC 130, before entering procedure 214 to create the second partition (the virtual BIOS MTD partition).

FIG. 3 shows the initiation process for flashing the BIOS memory 120 according to certain embodiments of the disclosure. Generally, the initiation process for flashing of the BIOS memory 120 is performed by an upgrade tool, such as a web up tool or any other client tool for starting the upgrading process. The communication medium of the upgrade tool may include out-of-band medium such as network, or in-band medium such as USB or keyboard controller style (KCS) tool, which is an interface often used between BMC and payload processor in the Intelligent Platform Management Interface (IPMI) architecture.

When the BMC is ready for flashing the BIOS memory 120, control enters procedure 302. In this embodiment, at procedure 202, control issues the flash update start. Control enters procedures 304 and 306 to determined whether the BIOS memory is in use by another processor such as the CPU. At procedure 304, control monitors and checks whether the CPU 112, which serves as the host processor, is powered up. If the host is powered up, control then checks at procedure 306 if the computer system 100 is in the BIOS mode. On the other hand, if the host is not powered up (for example, the CPU 112 is in the standby mode), or if the computer system 100 is not in the BIOS mode when the host is powered up (for example, the CPU 112 is in the operating mode), control enters procedure 310 to switch the MUX 140 such that the SP has access to the BIOS flash memory. In other words, at procedure 310, the MUX 140 is switched such that the BMC 130 has access to the BIOS memory 120, and information of the current BIOS software 122 is accessible to the BMC 130. Finally, control enters procedure 312 to send initiation complete signal to the upgrade tool.

FIG. 4 shows the upgrading process for flashing the BIOS memory 120 according to one embodiment of the disclosure. When the computer system 100 is ready for upgrading the BIOS software, control enters procedure 402. At procedure 402, control retrieves the reads the version of the current BIOS software 122 from the BMC 130. When the information of the current version is available, control enters procedure 404. At procedure 404, comparison between the current version and the version of the new BIOS software to be uploaded is performed. If the version of the new BIOS software is different from the current version at procedure 404, control enters procedure 406. On the other hand, if the version of the new BIOS software is the same as the current version, control enters procedure 408, requesting the user to confirm upgrade. If the user confirms upgrade at procedure 408, control also enters procedure 406. Otherwise, the upgrading process ends if the user does not confirm upgrade at procedure 408.

At procedure 406, control uploads the new BIOS software 150 (such as a BIOS image) to the RAM 1344 of the BMC 130. The uploading process may be performed from various interfaces, such as using web upgrade of internet protocols such as http/https, using command line tools, or using host based KCS tool. In some embodiments, the web upgrade uses http/https over TCP/IP, and the other two uploading mechanisms use AMI proprietary protocol over TCP/IP. It is also contemplated that different interface protocols may be used for uploading the new BIOS software 150 without changing the flashing process. In other words, the flashing mechanism remains the same regardless of the interface protocol used for uploading the new BIOS software 150.

After the uploading process, control enters procedure 410 to check if the uploaded new BIOS software 150 is complete. If the software uploading is complete, control enters procedure 412 to validate the new BIOS software 150 using checksum. Once the checksum validation of the new BIOS software 150 passes, control enters procedure 414 to validate an optional BIOS "magic header" of the new BIOS software 150. If the uploaded software is incomplete at procedure 410, or if the validation at procedures 412 or 414 fails, the upgrading process ends.

It is also contemplated that, in some embodiments, the checking and validation processes at procedures 410, 412 and 414 may be performed in any sequential order, and other checking and validation processes for the new BIOS software 150 may be included as additional checking and validation processes, or may replace the processes at procedures 410, 412 and 414, for the integrity of the new BIOS software 150.

After the new BIOS software 150 has been checked and validated, control enters procedure 416 to start flashing data of the new BIOS software 150. A comparison of the new BIOS software 150 and the current BIOS software 122 is performed before flashing, and the comparison is performed at individual sector level. Specifically, for every sector of the new BIOS software 150, control first enters procedure 418 to check if the sector is a protected sector, such as a sector storing data that involves factor default configuration or other protected information. If the sector is protected, control enters procedure 420, which is an option for the user to override the protection of the protected sector, or to leave the protected sector as is. If the user chooses not to override the protected sector, control enters procedure 428 to go to the next sector. Otherwise, if the sector is not protected at procedure 418, or if the protection of the protected sector is overrode at procedure 420, control enters procedure 422.

At procedure 422, control retrieves data from the each or selected sectors of the BIOS memory and compares the sector of the current BIOS memory 120 and the corresponding sector of the new BIOS software 150 (e.g. a BIOS image). If the sectors are the same, control enters procedure 430 and skips the sector, and then enters procedure 428 to go to the next sector. If the sectors are different, control enters procedure 424 to erase and flash the sector to the BIOS memory 120. The reading and writing of the sectors of the current BIOS software 122 from the BIOS memory can be for example performed using the read/write application programming interface (API) of the Linux kernel 136, which in turn are converted by the kernel 136 to the hardware level API for the BIOS memory 120 based on the access to the device (the virtual BIOS MTD partition 1364).

When the sector is flashed and replaced, control enters procedure 426, checking if comparison of all sectors of the BIOS software has been completed, and going back to procedure 428 if there are more sectors for comparison.

When comparison of all sectors is completed, control enters procedure 432. At procedure 432, controls again validate the flashed software (now the "current BIOS software 122") of the BIOS memory 120. If the current BIOS software 122 is validated, control enters procedure 434 to reboot the host. If validation at procedure 432 fails, the upgrading process ends.

In sum, the method and computer system as described in the disclosure utilize a SP or a BMC for flashing the BIOS memory of the computer system. The SP or the BMC is configured to execute a kernel such that, at the booting of the computer system, the kernel creates a second partition (the virtual BIOS MTD partition) corresponding to the BIOS memory even if the BIOS memory is not accessible to the SP or the BMC at the time of booting. Thus, when the BIOS memory is in a non-use status, the SP or the BMC may control the MUX such that the SP or the BMC has access to the BIOS memory, and the new BIOS software may be uploaded to the SP or the BMC for flashing the BIOS memory.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. For example, multiple probes may be utilized at the same time to practice the present disclosure. Accordingly, the scope of the present disclosure is defined by the appended claims rather than the foregoing description and the exemplary embodiments described therein.

What is claimed is:

1. A method of flashing a BIOS memory of a computer system including a baseboard management controller (BMC) and a host processor, the BMC including a first processor and a BMC memory, the method comprising:
    executing, at the first processor, a kernel to create at least one first partition for the BMC memory and a second partition for the BIOS memory;
    probing, at the first processor, the BMC memory to obtain information of the BMC memory;
    probing, at the first processor, the BIOS memory to obtain information of the BIOS memory;
    detecting, at the first processor, whether the host processor is accessing the BIOS memory;
    controlling a multiplexer (MUX) to allow the first processor to access the BIOS memory when the host processor is not accessing the BIOS memory; and
    retrieving first BIOS software, at the first processor, from the BMC memory and writing the first BIOS software to the BIOS memory.

2. The method of claim 1, further comprising:
    retrieving, at the first processor, from a data module first partition configuration information using identity information of the BMC memory obtained by probing;
    retrieving, at the first processor, default identity information preset for the BIOS memory when the probing for the BIOS memory fails;
    retrieving, at the first processor, from the data module second partition configuration information using the default identity information;
    creating, at the first processor, the at least one first partition in accordance with the first partition configuration information; and
    creating, at the first processor, the second partition in accordance with the second partition configuration information.

3. The method of claim 2, further comprising storing, in the data module, partition configuration information of a plurality of memory devices manufactured by more than one manufacturer.

4. The method of claim 3, wherein each of the first partition configuration information and the second partition configuration information contains identity of a manufacture and identity of a memory device.

5. The method of claim 1, further comprising:
    utilizing a communication interface between the first processor and the BMC memory to detect presence and identity of the BMC memory; and
    utilizing a communication interface between the first processor and the BIOS memory to detect presence and identity of the BIOS memory.

6. The method of claim 1, wherein the BMC memory comprises at least one writable non-volatile memory and one writable volatile memory.

7. The method of claim 6, wherein the at least one writable non-volatile memory of the BMC is a flash memory.

8. The method of claim 6, further comprising uploading the first BIOS software to the writable volatile memory.

9. The method of claim 1, further comprising:
    comparing data in a first sector of the BIOS memory with data in a second sector of a BIOS image, wherein the second sector corresponds to the first sector, and the BIOS image contains the first BIOS software; and
    in response to a determination that the data in the first sector differ from the data in the second sector, erasing the data in the first sector and writing the data in the second sector to the first sector.

10. The method of claim 9, wherein the comparing is performed when the first sector is not protected.

11. The method of claim 9, wherein the comparing further comprises overriding protection of the first sector.

12. The method of claim 9, further comprising validating the BIOS image using checksum.

13. The method of claim 9, further comprising validating a BIOS magic header of the BIOS image.

14. The method of claim 9, wherein the host processor does not access the BIOS memory when the host processor is in a standby mode or in an operating mode.

15. A computer system, comprising:
    a baseboard including a host processor and a BIOS memory, wherein the host processor is configured to execute an operating system;
    a baseboard management controller (BMC) in communication with the baseboard through an interface, the BMC including a first processor, a non-transitory computer readable medium storing a kernel and a BMC memory, wherein the BMC memory is configured to store first BIOS software, the first processor is configured to execute a kernel, and the executed kernel is configured to create at least one first partition for the BMC memory and a second partition for the BIOS memory; and
    a multiplexer (MUX) configured to operably control access to the BIOS memory by the first processor or by the host processor,
    wherein the kernel, when executed by the first processor, cause the first processor to
        probe the BMC memory to obtain information of the BMC memory,
        probe the BIOS memory to obtain information of the BIOS memory,
        detect whether the host processor is accessing the BIOS memory,
        control the MUX to allow the first processor to access the BIOS memory when the host processor is not accessing the BIOS memory, and
        retrieve the first BIOS software from the BMC memory and
        write the first BIOS software to the BIOS memory.

16. The computer system of claim 15, wherein the first processor is configured to:
retrieve, from a data module, first partition configuration information using identity information of the BMC memory obtained by probing,
retrieve default identity information preset for the BIOS memory when the probing for the BIOS memory fails,
retrieve, from the data module, second partition configuration information using the default identity information,
create the at least one first partition in accordance with the first partition configuration information, and
create the second partition in accordance with the second partition configuration information.

17. The computer system of claim 16, wherein the data module is configured to store partition configuration information of a plurality of memory devices manufactured by more than one manufacturer.

18. The computer system of claim 17, wherein each of the first partition configuration information and the second partition configuration information contains identity of a manufacture and identity of a memory device.

19. The computer system of claim 15, wherein the first processor is configured to:
utilize a communication interface between the first processor and the BMC memory to detect presence and identity of the BMC memory, and
utilize a communication interface between the first processor and the BIOS memory to detect presence and identity of the BIOS memory.

20. The computer system of claim 15, wherein the BMC memory comprises at least one writable non-volatile memory and one writable volatile memory.

21. The computer system of claim 20, wherein the at least one writable non-volatile memory of the BMC is a flash memory.

22. The computer system of claim 20, wherein the first processor is configured to upload the first BIOS software to the writable volatile memory.

23. The computer system of claim 15, wherein the first processor is configured to:
compare data in a first sector of the BIOS memory with data in a second sector of a BIOS image, the second sector corresponding to the first sector, and the BIOS image containing the first BIOS software, and
in response to a determination that the data in the first sector differ from the data in the second sector, erase the data in the first sector and write the data in the second sector to the first sector.

24. The computer system of claim 23, wherein the first processor is configured to compare the data in the first sector with the data in the second sector when the first sector is not protected.

25. The computer system of claim 23, wherein the first processor is configured to override protection of the first sector and then compare the data in the first sector with the data in the second sector when the first sector is not protected.

26. The computer system of claim 23, wherein the first processor is configured to validate the BIOS image using checksum.

27. The computer system of claim 23, wherein the first processor is configured to validate a BIOS magic header of the BIOS image.

28. The computer system of claim 23, wherein the host processor does not access the BIOS memory when the host processor is in a standby mode or in an operating mode.

29. A baseboard management controller (BMC), comprising:
a non-transitory computer readable medium storing a kernel;
a BMC memory configured to store first BIOS software; and
a first processor configured to
execute the kernel, wherein the executed kernel is configured to create a first memory partition for the BMC memory and a second memory partition,
probe the BMC memory to obtain information of the BMC memory,
probe the second memory to obtain information of the second memory
utilize the first memory partition to retrieve the first BIOS software from the BMC memory, and
utilize the second memory partition to output the first BIOS software.

30. The BMC of claim 29, wherein the first processor is configured to:
retrieve, from a data module, first partition configuration information using identity information of the BMC memory obtained by probing,
retrieve default identity information preset for the second memory when the probing for the second memory fails,
retrieve, from the data module, second partition configuration information using the default identity information,
create the first partition in accordance with the first partition configuration information, and
create the second partition in accordance with the second partition configuration information.

31. The BMC of claim 30, wherein the data module is configured to store partition configuration information of a plurality of memory devices manufactured by more than one manufacturer.

32. The BMC of claim 31, wherein each of the first partition configuration information and the second partition configuration information contains identity of a manufacture and identity of a memory device.

33. The BMC of claim 29, wherein the first processor is configured to:
utilize a communication interface between the first processor and the BMC memory to detect presence and identity of the BMC memory, and
utilize a communication interface between the first processor and the second memory to detect presence and identity of the second memory.

34. The BMC of claim 29, wherein the BMC memory comprises at least one writable non-volatile memory and one writable volatile memory.

35. The BMC of claim 34, wherein the at least one writable non-volatile memory is a flash memory.

36. The BMC of claim 34, wherein the first processor is configured to upload the first BIOS software to the writable volatile memory.

* * * * *